United States Patent [19]
Yaso et al.

[11] Patent Number: 5,212,564
[45] Date of Patent: May 18, 1993

[54] FACSIMILE SYSTEM FOR RECORDING RECEIVED PICTURE DATA HAVING BUFFER WITH SELECTABLE STORAGE

[75] Inventors: Kenji Yaso, Kawasaki; Masaya Yamamoto, Yokohama, both of Japan

[73] Assignee: Fujitsu Limited, Kawasaki, Japan

[21] Appl. No.: 613,016

[22] Filed: Nov. 15, 1990

[30] Foreign Application Priority Data

Nov. 15, 1989 [JP] Japan .................. 1-296419

[51] Int. Cl.$^5$ .......................... H04N 1/419
[52] U.S. Cl. .................. 358/426; 358/261.4
[58] Field of Search .............. 358/426, 261.4, 431, 358/444; 382/56

[56] References Cited

U.S. PATENT DOCUMENTS

| | | | |
|---|---|---|---|
| 4,663,671 | 5/1987 | Seto | 358/426 |
| 4,695,895 | 9/1987 | Nagashima | 358/426 |
| 4,805,135 | 2/1989 | Ochi et al. | 358/426 |
| 4,937,681 | 6/1990 | Fujinawa et al. | 358/426 |

OTHER PUBLICATIONS

Japanese Translation of Standarzation of Group 3 Facsimile Apparatus for Document Transmission (Geneva 1980), pp. 265-279.

*Primary Examiner*—Edward L. Coles, Sr.
*Assistant Examiner*—Kim Yen Vu
*Attorney, Agent, or Firm*—Staas & Halsey

[57] ABSTRACT

A system for recording received picture data for facsimile transmission includes a compressor for encoding decoded received picture data per line as a unit and compressing the encoded picture data to produce compressed data. A decision unit is connected to the compressor to decide whether the number of bits of the compressed picture data or the number of bits of the restored picture data is smaller to produce a control signal representing the decision result. A buffer storage unit is operatively connected to the compressor for storing the picture data having a smaller number of bits decided by the the decision unit. The system also includes an output decoder connected to the buffer unit for delivering a decoded original picture data in the buffer storage when the data from the buffer storage is compressed data and delivering the data from the buffer storage unit when the data from the buffer storage unit is original picture data.

4 Claims, 4 Drawing Sheets

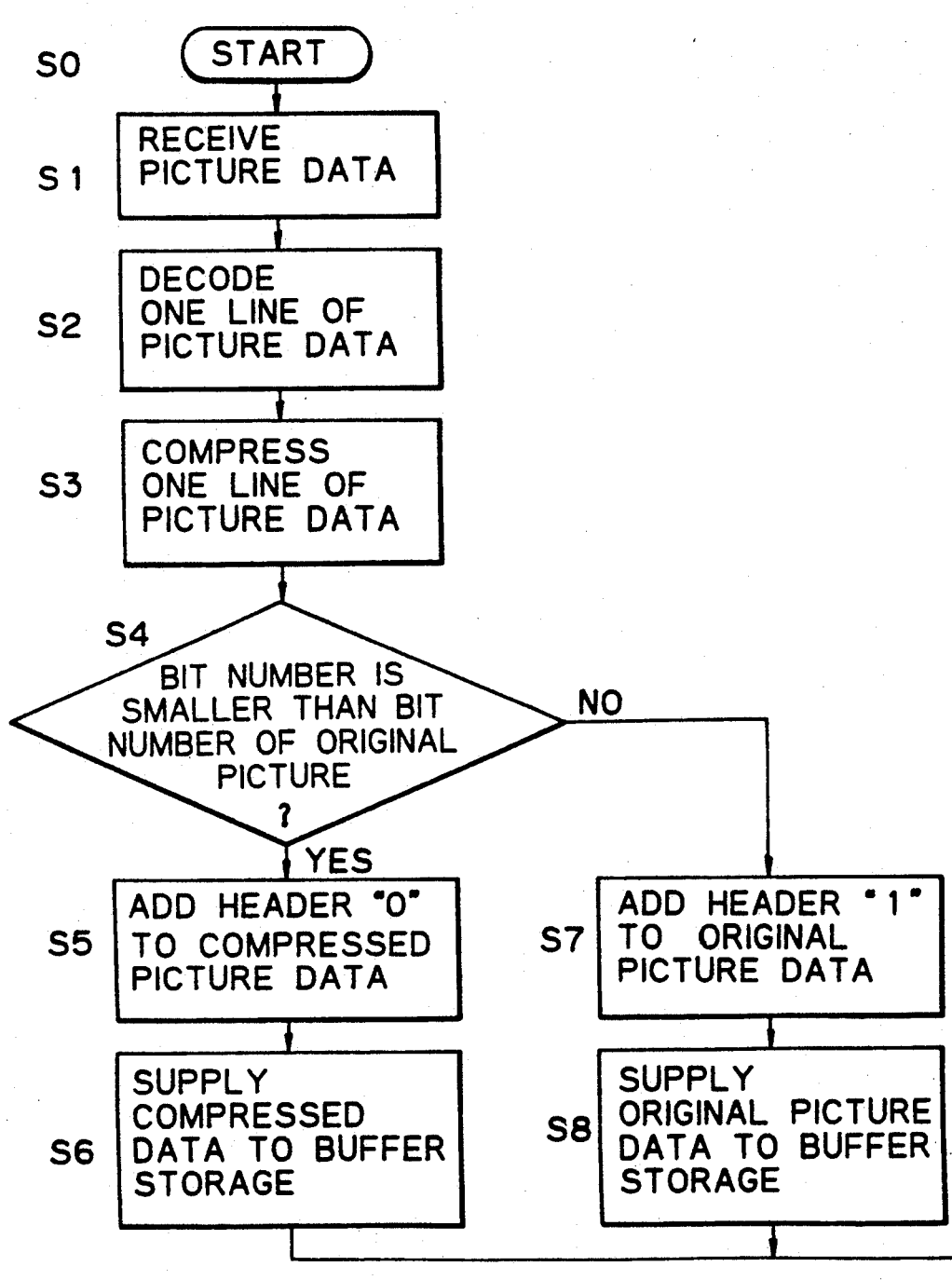

FACSIMILE SYSTEM FOR RECORDING RECEIVED PICTURE DATA HAVING BUFFER WITH SELECTABLE STORAGE

BACKGROUND OF THE INVENTION

1. Field of the Invention

The present invention relates to a system for recording received picture data for facsimile data transmission.

2. Description of the Related Art

In a facsimile data transmission using an electronic photographic recording process, such as a G3 facsimile transmission, there is a difference between the data receiving speed and the output speed of the recorded data for which the waiting time for the record output is taken into account.

For dealing with the speed difference, in one prior art device, a plurality of page storage for recording the received data is provided to absorb the speed difference. In another prior art device, a plurality of sheets of the recorded data is first accumulated in file storage and then the data stored in the file storages is successively supplied to a page storage for recording.

However, in the former above-mentioned prior art device, there is a problem that a great number of page storage for recording is needed. In the latter above-mentioned prior art device there is a problem that a great number of file storage for accumulation is needed. In addition, in the prior art, there is a problem that when the amount of the supplied picture data is greater than the capacity of the storage, a data overflow will occur preventing the data from being correctly received and recorded.

SUMMARY OF THE INVENTION

It is an object of the present invention to provide an improved system for recording received picture data for facsimile transmission in which the capacity of the storage required for recording the received picture data can be reduced and the occurrence of picture data overflow can be prevented.

SUMMARY OF THE INVENTION

It is an object of the present invention to provide a system for recording received picture data for facsimile transmission, including: a unit for receiving a facsimile transmitted signal of picture data; a decoder unit for decoding the received signal of the picture data to produce restored picture data; a compressor unit for encoding the decoded picture data per line as a unit and compressing the encoded picture data to produce compressed picture data; a decision unit connected to the compressor means to decide whether the number of bits of the compressed picture data or the number of bits of the restored picture data is smaller to produce a control signal representing the decision result; a buffer storage related to the decoder unit and the compressor unit for storing the picture data having the smaller number of bits decided by the decision unit; an output decoder unit related to the buffer storage unit for delivering decoded original picture data in the buffer storage when the data from the buffer storage is compressed data and delivering the data itself from the buffer storage when the data from the buffer storage is original picture data; and a printing unit connected to the output decoder unit to print the picture data delivered from the output decoder unit.

BRIEF DESCRIPTION OF THE DRAWINGS

FIGS. 3A, 3B are flow charts of the operation of the system shown in FIG. 2.

DESCRIPTION OF THE PREFERRED EMBODIMENTS

Figure 1:
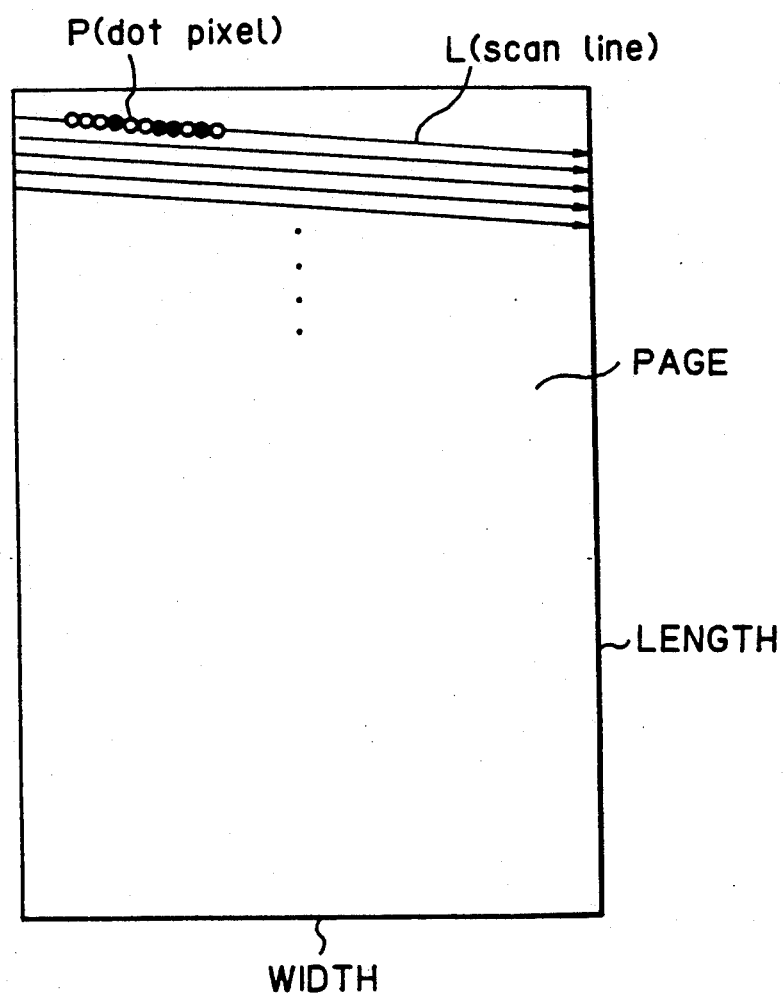
FIG. 1 is a diagram of a page for which a facsimile data transmission is to be carried out and for which the system according to the present invention can be used.

An example of a page for which a facsimile data transmission is to be carried out and for which the system according to the present invention can be used is illustrated in FIG. 1. With regard to the dot pixels P on an A4 size page, 2500 dots are arranged along the length of the page and 1728 dots are arranged along the width of the page. The scanning of the page is carried out along the scan lines L at a density of, for example, 7.7 lines per mm along the length of the page. A dot pixel of a picture corresponds to one bit of picture data.

If there are 2500 dots along the length and 1728 dots along the width, the number of the entire dots on an A4 size page is 4,320,000 dots which is approximately 4 million dots, i.e., 4 Mbits.

For a coding process for suppressing the degree of redundancy of data in a facsimile transmission, a compression method, for example, the modified READ (MR), the modified Huffman (MH), or the modified MR (MMR) method can be used.

Figure 2:
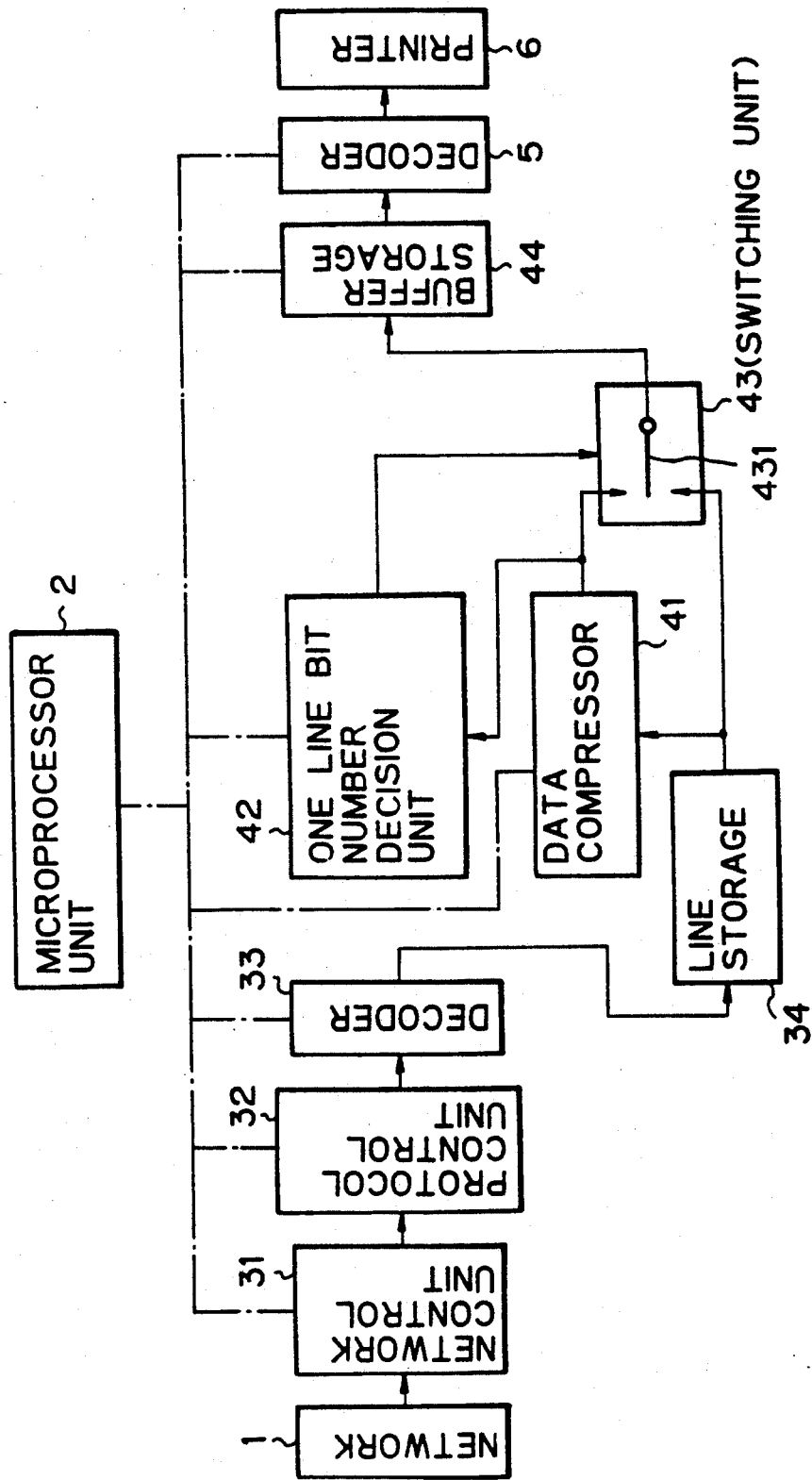
FIG. 2 is a block diagram of a system for recording received picture data for facsimile data transmission according to an embodiment of the present invention.

A system for recording a received picture data for facsimile data transmission according to an embodiment of the present invention is shown in FIG. 2. The operations of the units of the system for a network 1 are controlled by a microprocessor unit 2.

The system includes the microprocessor unit 2, a network control unit 31, a protocol control unit 32, a decoder 33, a line storage 34, a data compressor 41, a one line bit number decision unit 42, a switching unit 43, a buffer storage 44, a decoder 5, and a printer 6.

In the network control unit 31, the picture data signal is received from the network 1. In the protocol control unit 32, the signal from the network control unit 31 is demodulated and coded data is delivered. In the decoder 33 which includes an end-of-line detector, the signal is decoded to restore the original picture data, and monitoring of errors is carried out in the restoration of the original picture data.

In the line storage 34, the restored original picture data from the decoder 33 is temporarily stored as the picture data for one line or for a plurality of lines. In the data compressor 41, the data read from the line storage 34 is compressed to produce compressed picture data.

The original picture data read from the line storage 34 and the compressed picture data produced in the data compressor 41 are supplied to the one line bit number decision unit 42, and a decision is made concerning whether of the number of bits of the supplied original picture data or the number of bits of the supplied compressed picture data is smaller. The output signal of the one line bit number decision unit 42 representing the result of the decision is supplied as a control signal to the switching unit 43.

When the number of bits of the compressed picture data is smaller than the number of bits of the original picture data, the switch 431 of the switching unit 43 is actuated upwardly to supply the compressed picture data from the data compressor 41 to the buffer storage 44 to store the compressed picture data therein.

When the number of bits of the original picture data is less than the number of bits of the compressed picture data, the switch 431 of the switching unit 43 is actuated downwardly to supply the original picture data from the line storage 34 to the buffer storage 44 to store the original picture data therein.

When the compressed picture data is stored in the buffer storage 44, the header bit "0" is added at the beginning of the compressed picture data to be stored. When the original picture data is stored in the buffer storage 44, the header bit "1" is added at the beginning of the original picture data to be stored.

In the decoder 5, when the picture data read from the buffer storage 44 is compressed picture data, this compressed picture data is restored to the original picture data and the restored original data is supplied to the printer 6. When the picture data read from the buffer storage 44 is the original picture data, the original picture data is supplied to the printer 6.

Figure 3B:
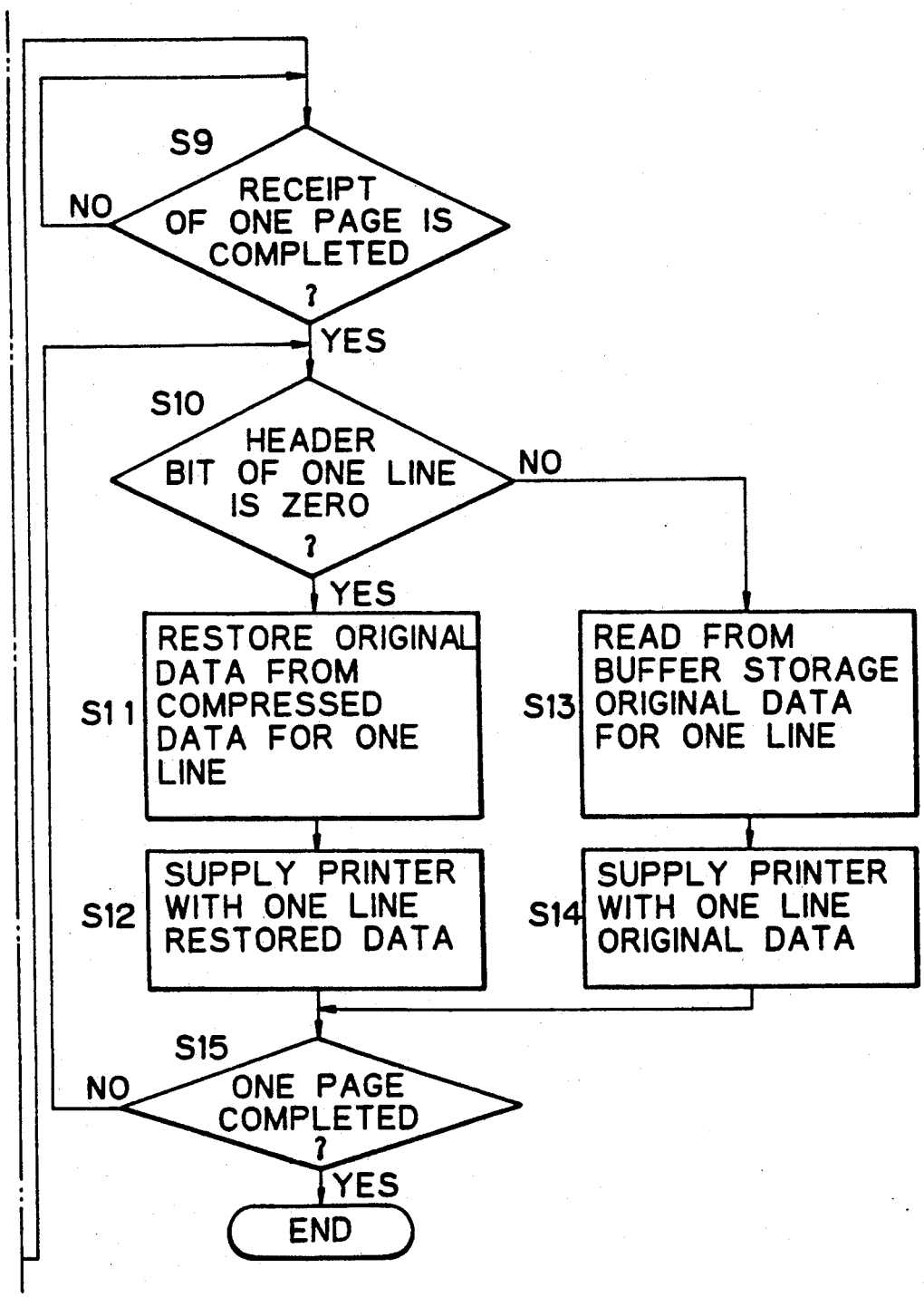

The operation of the system shown in FIG. 2 is explained with reference to the flow chart shown in FIG. 3.

In step S1, the transmitted picture data is received. In step S2, one line of the picture data is decoded to restore the original picture data. In step S3, the data of the one line is compressed to produce the compressed one line picture data. In step S4, a decision of whether or not the number of bits of the compressed picture data for one line is smaller than the number of bits of the original picture data for one line is carried out.

When the decision in step S4 is YES, the process proceeds to step S5 where the header bit "0" is added to the beginning of the compressed picture data. In step S6 the compressed picture data is supplied to the buffer storage 44. When the decision in step S4 is NO, the process proceeds to step S7 where the header bit "1" is added to the beginning of the original picture data. Then in step S8 the original picture data is supplied to the buffer storage 44.

In step S9, a decision of whether or not the receipt of one page picture data is completed is carried out. When the decision is YES, the process proceeds to step S10, and, when the decision is NO, the operations are carried out repetitively per line as a unit.

In step S10, a decision of whether or not the header bit of the one line picture data is zero is carried out. When the decision in step S10 is YES, the process proceeds to step S11 where the original picture data is restored from the compressed picture data for one line. Then in step S12, the restored picture data for one line is supplied to the printer 6. When the decision in step S10 is NO, the process proceeds to step S13 where the original picture data for one line is read from the buffer storage 44. Then in step S14 the original picture data for one line is supplied to the printer 6.

In step S15, the decision of whether or not the printing of one page by the printer is completed is carried out. When the decision is NO, the process returns to step S10 to repeat the subsequent steps, and when the decision is YES, the operation is terminated.

According to the experience of the inventor, in a practical design of the system shown in FIG. 2, the storage capacity needed in the system for the facsimile transmission of A4 size pages which are 2560 dots in length and 1728 dots in width, is a single 4 Mbits of storage. Contrary to this, in the prior art system for recording the received picture data for the facsimile transmission, usually, a storage capacity of 8 Mbits of storage is needed, i.e., twice the storage capacity must be provided.

We claim:

1. A system for recording received picture data for facsimile transmission, comprising:
   means for receiving a facsimile transmitted signal of picture data;
   decoder means for decoding the received signal of the picture data to produce original picture data;
   compressor means for encoding the original picture data per unit line and compressing to produce compressed picture data;
   decision means, operatively connected to said compressor means, for deciding which of the number of bits of a unit line of the compressed picture data or the number of bits of a unit line of the original picture data is smaller and outputting a control signal representing the decision result;
   buffer storage means, operatively connected to said decoder means and said compressor means, for storing the picture data having a smaller number of bits decided by said decision means;
   output decoder means, operatively connected to said buffer storage means, for outputting and uncompressing picture data from said buffer storage means when the data from said buffer storage means is compressed picture data and outputting the data from said buffer storage means when the data from said buffer storage means is original picture data; and
   printing means, operatively connected to said output decoder means, for printing the picture data output from said output decoder means.

2. A method for recording received picture data for facsimile transmission comprising the steps of:
   (a) receiving and decoding transmitted picture to produce original picture data;
   (b) compressing the original picture per unit line to produce compressed picture data;
   (c) determining whether the number of bits of one unit line of compressed picture data is smaller than the number of bits of one unit line of original picture data;
   (d) inputting into a buffer storage the one unit line of compressed picture data and a header bit indicating compressed picture data when in said step (c) the number of bits of one unit line of compressed picture data is smaller than the number of bits of one unit line of original picture data;
   (e) inputting into buffer storage the one unit line of the original picture data and a header bit indicating original picture data when in said step (c) the number of bits of one unit line of compressed picture data is not smaller than the number of bits of one unit line of original picture data;
   (f) restoring the one unit line of picture data from compressed picture data when the header bit of the one unit line of picture data indicates compressed picture data;
   (g) reading the original picture data for one unit line from the buffer storage when the header bit of the one unit line of picture data indicates original picture data; and (h) printing one of the one unit line of picture data from compressed picture data and original picture data.

3. A system for recording a received facsimile transmitted signal of picture data, comprising:

decoder means for decoding the received signal of the picture data to produce original picture data;

compressor means for receiving the original picture data per unit line and compressing to produce compressed picture data;

decision means for deciding which of a number of bits of each unit line of the compressed picture data or a number of bits of each unit line of the original picture data is smaller and outputting a control signal representing a decision result;

buffer storage means for storing either the compressed picture data or the original picture data based on the decision result indicating a smaller number of bits decided by said decision means and for storing a header bit to indicate whether compressed picture data or original picture data has been stored;

output decoder means for outputting and uncompressing picture data from said buffer storage means when the header bit indicates that the data from said buffer storage means is compressed picture data and outputting the picture data from said buffer storage means when the header bit indicates that the data from said buffer storage means is original picture data; and printing means for printing the picture data output from said output decoder means.

4. A system according to claim 3, wherein each unit line consists of one line of the picture data.

* * * * *